United States Patent [19]

Mesenich

[11] Patent Number: 4,883,252
[45] Date of Patent: Nov. 28, 1989

[54] ELECTROMAGNET AND VALVE ASSEMBLY

[75] Inventor: Gerhard Mesenich, Bochum, Fed. Rep. of Germany

[73] Assignee: Colt Industries Inc., New York, N.Y.

[21] Appl. No.: 300,030

[22] Filed: Jan. 23, 1989

[51] Int. Cl.$^4$ .............................................. F16K 31/06
[52] U.S. Cl. ........................... 251/129.18; 251/129.21; 251/129.22; 251/129.15; 251/129.05; 239/585; 123/472
[58] Field of Search ...................... 251/129.18, 129.21, 251/129.22, 129.15, 129.05; 123/472; 239/585

[56] References Cited

U.S. PATENT DOCUMENTS 4,676,478  6/1987  Kiuchi .................... 251/129.21 X
4,767,097  8/1988  Everett et al. ............ 251/129.18 X Primary Examiner—Arnold Rosenthal
Attorney, Agent, or Firm—Walter Potoroka, Sr.

[57] ABSTRACT

A fuel injection fuel supply system for a combustion engine has a fuel injector valve effective for metering and injecting metered fuel to the engine induction system; an electromagnetic assembly having a magnetic open loop is used for cyclically opening and closing the injector valve.

6 Claims, 4 Drawing Sheets

ELECTROMAGNET AND VALVE ASSEMBLY

FIELD OF THE INVENTION

This invention relates generally to liquid metering systems, as for example a fuel metering system for a combustion engine, and particularly to the valving means employed within such a liquid metering system and with greater particularity to an electromagnetic motor means for use in operating such valving means.

BACKGROUND OF THE INVENTION

Even though the automotive industry has over the years, if for no other reason than seeking competitive advantages, continually exerted efforts to increase the fuel economy of automotive engines, the gains realized thereby have been deemed by governmental bodies as being insufficient and such governmental bodies continue to impose increasingly stringent regulations relative to engine fuel economy as well as the maximum permissible amounts of carbon monoxide, hydrocarbons and oxides of nitrogen which may be emitted by the engine exhaust gases into the atmosphere.

In an attempt to meet such stringent regulations, the prior art has heretofore proposed the employment of a carburetor structure provided with electromagnetic duty-cycle valving means whereby the carburetor structure still functioned as an aspirating device but where the rate of fuel flow being aspirated is controllably modified by the duty-cycle valving means in response to feedback signals indicative of engine operation and other attendant conditions. Such carbureting structures, in the main, have not been found to be capable of satisfying the said continually increasing stringent regulations.

The prior art has also proposed the use of fuel metering injection means wherein a plurality of nozzle assemblies, situated as at the intake valves of respective cylinders of a piston engine, would receive fuel, under super atmospheric pressure, from a common fuel metering source and inject such fuel directly into the respective cylinders of the engine with such injection being done in timed relationship to engine operation. Such fuel injection systems, besides being costly, have not proven to be generally successful in that the system is required to provide metered fuel flow over a very wide range of metered fuel flows. Generally, those prior art injection systems which are very accurate at one end of the required range of metered fuel flows, are relatively inaccurate at the opposite end of that same range of metered fuel flows. Also, those prior art injection systems which are made to be accurate in the mid-portion of the required range of metered fuel flows are usually relatively inaccurate at both ends of that same range. The use of feedback means for altering the metering characteristics of such prior art fuel injection systems has not solved the problem of inaccurate metering because the problem usually is intertwined within such factors as: effective aperture area of the injector nozzle; comparative movement required by the associated nozzle pintle or valving member; inertia of the nozzle valving member; and nozzle "cracking" pressure (that being the pressure at which the nozzle opens). As should be apparent, the smaller the rate of metered fuel flow desired, the greater becomes the influence of such factors thereon.

The prior art has also heretofore proposed the employment of a throttle body with one or more electromagnetic duty-cycle type of fuel metering valving assemblies operatively carried thereby and spraying metered fuel, on a continual basis, into the air stream flowing through the throttle body and into the engine induction or intake manifold. Even though such arrangements, generally, are effective for providing closely controlled metered rates of fuel flow, they are nevertheless limited in their ability to meet the said increasingly stringent regulations. This inability is at least in part due to the fact that in such systems the throttle body is employed in combination with an engine intake or induction manifold through which the air and sprayed-fuel mixture is supplied to the respective engine cylinders. Because of design limitations, engine characteristics, cost factors and lack of repeatability in producing substantially identical intake manifolds, certain of the engine cylinders become starved for fuel when other engine cylinders are provided with their required stoichiometric fuel-air ratios. Consequently, the richness (in terms of fuel) of the entire fuel delivery system has to be increased to a fuel-air ratio which will provide the required stoichiometric fuel-air ratio to the otherwise starved engine cylinder or cylinders to obtain proper operation thereof. However, in so doing, the other engine cylinder or cylinders receive a fuel-air supply which is, in fact, overly rich (in terms of fuel) thereby resulting in reduced engine fuel economy and the increased production of engine exhaust emissions.

The prior art has also heretofore proposed the employment of a throttle body, which serves only to control the rate of air flow to an associated engine intake manifold, in combination with a plurality of electromagnetic duty-cycle type of fuel metering valving assemblies wherein respective ones of said plurality of duty-cycle valving assemblies are positioned in close proximity to respective ones of a plurality of engine cylinders as to thereby meter and discharge fuel into the induction system at respective points which are at least closely situated to the intake valves of the associated engine cylinder. In such an arrangement, it is often accepted practice to provide a common manifold of fuel, regulated at super atmospheric pressure, which feeds or supplies unmetered fuel to the respective duty-cycle valving assemblies where the metering function is performed. These systems are very costly in that a plurality of duty-cycle valving and metering assemblies are required and such valving assemblies, to obtain optimum performance, must be flow-matched to each other as sets for the engine. Further, in such arrangements, it is accepted as best practice to replace all duty-cycle valving assemblies upon failure of one or more in order to thereby again result in a matched set of injectors for the engine. Also, in such systems, if one of the injectors or duty-cycle valving means starts to malfunction, and if exhaust constituent sensor and feedback signal generating means are employed, the associated electronic control means will attempt to further increase or decrease (as the case may be) the richness of the fuel-air ratio of the remaining injector assemblies since the exhaust feedback signal cannot distinguish whether the change sensed in the exhaust constituents is due to one or more injector assemblies malfunctioning or whether the overall system needs a modification in the rate of metered fuel flow.

The prior art electromagnetic fuel metering and injector assemblies have also been found wanting. That is, in order to obtain optimum fuel metering accuracy, short and stable valve opening and closing times are essential. However, the stability of the opening and closing time is adversely affected by instabilities of the mechanical and hydraulic forces on the armature and/or valve. (The armature and valve may in fact be one and the same member.)

The variation or change in such mechanical force is due to variations or change of the coefficient of friction of the relatively moving parts or components and unstable return-spring loads with such being caused by spring oscillations.

The unstable portion of the hydraulic forces (from fuel or other liquids being metered) occurs only during the first few micrometers of armature-valve stroke, in the valve opening direction, and such can be regarded as a "break-loose-force". This break-loose-force is created by an unbalanced hydraulic force which, in turn, is caused by a vacuum effect at the contacting or sealing surface of the armature-valve. The vacuum effect occurs as the armature-valve first starts to move (in the opening direction) away from the cooperating valve seating surface. That is, when the armature-valve is in its closed position the sealing surface thereof is closed against and sealingly engaged with the juxtaposed valve seating surface. As the armature-valve starts to move in its opening direction such juxtaposed sealing and seating surfaces are separated from each other defining a flow space or flow gap therebetween. However, such flow gap is formed faster than the surrounding fuel (or other liquid to be metered) can fill it. Such a delay in the fuel filling the gap causes the vacuum effect tending to resist the opening movement of the armature-valve. Further, the break-loose-force is dependent upon the unbalanced hydraulic pressure experienced by the armature-valve and the surface finish of the juxtaposed sealing and seating surfaces defining the flow space or gap. The unbalanced hydraulic pressure changes in response to the hydraulic pressure waves in the liquid to be metered.

The surface finish of the juxtaposed sealing and seating surfaces changes due to the very high pressure, experienced by such surfaces, which occurs as when the armature-valve strikes the cooperating valve seat portion when moving in its closing direction. Depending upon the geometric configuration of the sealing and seating surfaces and therefore the flow gap, such pressures can be as high as several times 15,000.0 p.s.i. During use, such developed high pressure in effect polishes or burnishes the cooperating sealing and seating surfaces resulting in an improved surface finish in both the sealing and seating surfaces. Such an improving or improved surface finish, in turn, increases the bearing area and the fluid flow resistance thereby changing the break-loose-force during initial opening of the armature-valve. Mainly depending upon the width of the flow gap, the opening gap, generally, is filled with fuel (or other liquid to be metered) within the first 3.0 to 10.0 micrometers of the opening stroke of the armature-valve.

The instabilities of the mechanical and hydraulic forces change or alter the required magnetic force level or magnitude at the beginning of the opening movement of the armature-valve. Such an altered or changed magnitude of required magnetic force may be anywhere in a range of values, which may be termed a band of uncertainty, and such, in turn, determines the delay time of the magnetic system.

All of such factors of the prior art contribute to unstable operating characteristics of the prior art electromagnetic motor means and in particular to short stroke fast acting electromagnetic fuel valving assemblies of the prior art.

The invention as herein disclosed and described is primarily directed to the solution of the aforestated and other related and attendant problems of the prior art.

SUMMARY OF THE INVENTION

According to one aspect of the invention, an electromagnetic motor comprises stationary magnetic body means of magnetic material, said magnetic body means being formed as to have an axis of revolution, pole piece means situated as to be centrally of and stationary with respect to said magnetic body means, electrical coil means effective upon energization thereof to create a magnetic field, armature means, said armature means being moved into contact with said pole piece means upon energization of said coil means, said magnetic body means and said pole piece means functioning to provide a magnetic flux path loop about said electrical coil means upon energization thereof, wherein said flux path loop is comprised of a non-moving portion of said electromagnetic motor and of a moving portion of said electromagnetic motor, wherein said moving portion of said electromagnetic motor comprises said armature means, wherein said non-moving portion of said electromagnetic motor comprises said pole piece means and said stationary magnetic body means, additional means forming a significantly non-magnetic interruption in said non-moving portion of said electromagnetic motor for enhancing flux leakage thereby reducing the flux decay time in said flux path loop, and wherein said armature means is of cup-shaped configuration having an armature axial end wall and an armature cylindrical side wall.

Various general and specific objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views.

DETAILED DESCRIPTION OF THE PREFERRED EMBODIMENT OF THE INVENTION

Figure 1:
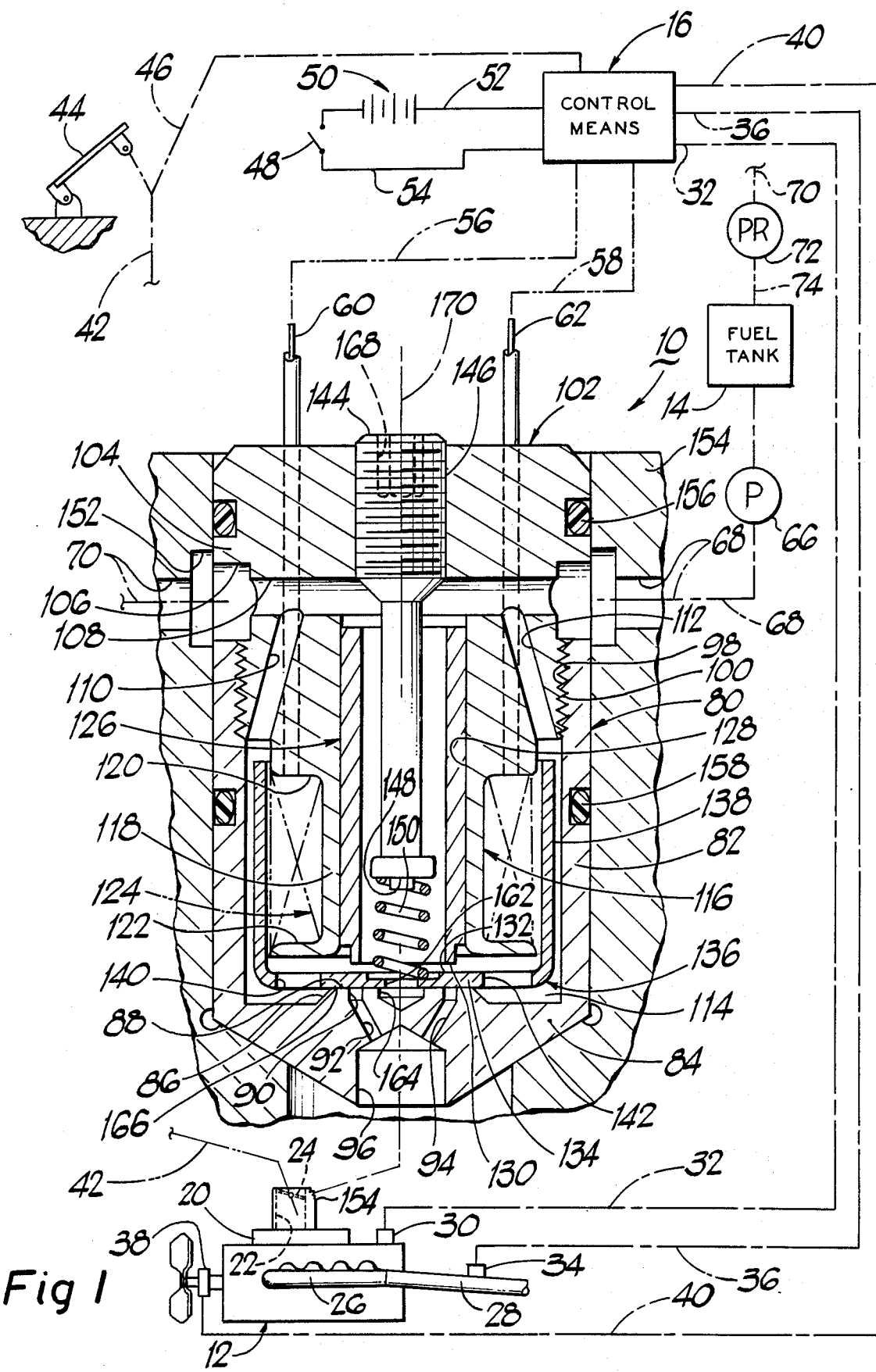
FIG. 1 is a view of a fuel metering assembly, employing teachings of the invention, along with both diagrammatically and schematically illustrated elements and components depicting, in simplified manner, an overall fuel supply and metering system for an associated combustion engine, with said fuel metering assembly being illustrated in relatively enlarged scale and in axial cross-section.

Referring now in greater detail to the drawings, FIG. 1 illustrates a fuel metering and delivery apparatus or system 10, a combustion engine 12, a fuel reservoir or fuel tank 14 and an associated control means 16.

The engine 12 may be provided with a manifold-like induction passage means 20 which communicates with the ambient atmosphere as by induction passage means 22 having a pivotally mounted and manually positionable throttle valve means 24 therein. An air intake cleaner, not shown but well known in the art, may be operatively connected to the intake end of induction passage means 22. The induction manifold or passage means 20 serves to communicate with the respective intake port means of the respective engine cylinders. An engine exhaust manifold 26 communicates with the respective exhaust port means of the respective engine cylinders and with an engine exhaust pipe or conduit 28 which discharges the engine exhaust to ambient.

The control means 16 may comprise, for example, suitable electronic logic type control and power output means effective to receive one or more parameter type input signals and in response thereto produce related outputs. For example, engine temperature responsive transducer means 30 may provide a signal via transmission means 32 to control means 16 indicative of the engine temperature; sensor means 34 may sense the relative oxygen content of the engine exhaust gases (as within engine exhaust conduit means 28) and provide a signal indicative thereof via transmission means 36 to control means 16; engine speed responsive transducer means 38 may provide a signal indicative of engine speed via transmission means 40 to control means 16 while engine load, as indicated for example by the position of the engine induction system throttle valve means 24, may provide a signal as via transmission means 42 operatively connected to an engine operator's foot-actuated throttle pedal lever 44 and operatively connected as by the same transmission means or associated transmission means 46 to control means 16. A source of electrical potential 48 along with related switch means 50 may be electrically connected as by conductor means 52 and 54 to control means 16. The output terminals of control means 16 are respectively electrically connected as via conductor means 56 and 58 to electrical terminals or conductors 60 and 62, of the metering means 10, which in turn are electrically connected to opposite electrical ends of an associated electrical field generating coil means.

The fuel tank or reservoir means 14 supplies fuel to associated fuel pump means 66 (which may be situated internally of the reservoir means 14) which, in turn, supplies fuel at a superatmospheric pressure via conduit means 68 to the inlet of the metering apparatus or means 10. Outlet or return conduit means 70 serves to return excess fuel to an area upstream of the pump 66 as, for example, to the inlet pressure regulating means 72 the outlet of which communicates via 74 with the fuel reservoir means 14.

The valving and/or injector assembly 10 is illustrated as comprising a generally tubular cup-shaped like magnetic body 80 having an axially extending annular side wall 82 and a generally transverse axial end wall 84. The inner surface of end wall 84 is preferably provided with an annular raised portion 86 having an end face 88. An annular groove or recess 90 formed into end face 88 is in turn provided with a plurality of nozzle-like passages, two of which are shown at 92 and 94, which may also communicate with an orifice or passage 96 communicating as with the engine induction system.

The upper end of annular side wall 82 is provided with an internally threaded portion 98 which coacts with an externally threaded portion 100 of a non-magnetic support body 102.

The non-magnetic support body 102 may be comprised as of a generally upper disposed support portion 104 and a relatively lower bobbin portion. The support portion 104 may comprise the threaded portion 100, an annular or circumferential recess 106, transverse passage or conduit means 108 and a plurality of conduits as at 110 and 112 which communicate between conduit means 108 and the interior space 114. The lower bobbin portion 116 may comprise a relatively thin-wall tubular portion 118 and axially spaced radially extending end walls 120 and 122 which, in turn, accept a field coil means 124 which has its electrical leads suitably connected to electrical conductors or terminals 60 and 62 which, in a sealing relationship, may extend through and beyond the upper end of support body 102. Such electrical terminals 60 and 62 may be connected to the associated parameter sensing and control means 16 as depicted in FIG. 1.

A tubular pole piece 126, suitably retained within a cylindrical bore 128 formed in support body 102, has an axial end face 130 of annular configuration which is spaced from and juxtaposed to an inner face 132 of an end wall portion 134 of a cylindrical cup-shaped armature-valve member 136. In the embodiment illustrated, the cylindrical side wall 138 of the armature-valve member 136 extends axially a substantial distance and preferably over the entire axial length of the coil means 124 when the armature-valve 136 is in its closed position against valve seating surface 88. In the preferred form of the embodiment, the end wall 134 of armature-valve 136 is provided with a plurality of apertures or passages (two of which are shown at 140 and 142) formed therethrough for purposes of hydraulic balance.

An adjustable spring perch member 144 is illustrated as being adjustably threadably secured, as at 146, to the upper portion 104 of support body 102 and extends axially inwardly of tubular pole piece 126 as to terminate in a spring seat portion 148 against which one end of a return spring 150 abuts. The other end of the return spring 150 may be received as within a counterbore-like pocket or recess formed in the end wall 134 of armature-valve 136. Suitable sealing means (not shown) may of course be provided in order to prevent leakage past the threaded connection 146.

An annulus 152 may be formed in associated support structure 154 (which may comprise a portion of induction means 20) and fuel under superatmospheric pressure is supplied as via conduit means 68 from where it flows into annulus 152 and annular recess 106 and thereafter into conduit means 108. Fuel vapor venting means (if such be desired) are not shown since such are generally well known in the art and could take any form desired. Further, suitable sealing means, such as O-rings 156 and 158 may be provided to prevent fuel leakage.

In any event, the fuel supplied to conduit means 108 flows via passages 110 and 112 into the interior 114 thereby effectively filling the available space both inwardly and outwardly of the armature-valve 136. Further, fuel is also supplied, from conduit 108, into the cylindrical bore 106 of pole piece means 126. An aperture 162 formed in the end wall 134 of cup-shaped armature-valve 136 serves to vent otherwise created hydraulic forces during movement of the armature-valve 136, especially in its closing direction and also serves to provide for fuel flow into a fuel chamber 164 which, upon opening movement of the armature-valve 136, functions to supply fuel flow radially outwardly to the fuel annulus 90.

The valving assembly 10 is primarily intended for duty-cycle type operation. When the coil means 124 is in its de-energized state, spring 150 holds the armature-valve 136 in its closed position whereat the sealing surface 166 of valve member 136 is in sealing engagement with seating surface means 88. At this time all flow of fuel to the annular fuel manifold or collection recess 90, from the interior 114, is terminated.

When coil means 124 becomes energized a magnetic flux is generated and such flux path includes the armature-valve 136, pole piece means 126 and magnetic body means 80. As a consequence of such flux field, armature-valve 136 is drawn upwardly against the resilient resistance of spring means 150. Such upward movement of the armature-valve 136 continues until inner surface 132 thereof abuts against pole piece end face means 130. Such total stroke or travel of armature valve 136, from its seated or closed position to its fully opened position against pole piece end face 130 may be, for example, in the order of 0.0005 inch.

When energization of field coil means 124 is then terminated, spring 150 moves armature-valve 136 downwardly through its down stroke until the armature-valve 136 is again sealingly seated against cooperating seating surface means 88.

OPERATION OF THE INVENTION

The rate of metered fuel flow, in the embodiment disclosed, will be principally dependent upon the relative percentage of time, during an arbitrary cycle time or elapsed time, that the valve member 136 is relatively close to or seated against seating surface means 88 of the body portion 86 as compared to the percentage of time that the valve member 136 is opened or away from the cooperating seating surface means 88.

This is dependent upon the output to coil means 124 from the control means 16 which, in turn, is dependent upon the various parameter signals received by the control means 16. For example, if the oxygen sensor and transducer means 34 senses the need of a further fuel enrichment in the motive fluid being supplied to the engine and transmits a signal reflective thereof to the control means 16, the control means 16, in turn, will require that the metering valve 136 be opened a greater percentage of time as to provide the necessary increased rate of metered fuel flow. Accordingly, it will be understood that given any selected parameters and/or indicia of engine operation and/or ambient conditions, the control means 16 will respond to the signals generated thereby and respond as by providing appropriate energization and de-energization of coil means 124 (causing corresponding movement of valve member 136) thereby achieving the then required metered rate of fuel flow to the engine 12.

More particularly, assuming that the coil means 124 is in its de-energized state, spring 150 will urge valve member 136 downwardly causing the lower axial end face or valving surface 166 thereof to sealingly seat against the cooperating seating surface means 88 of body portion 86 thereby preventing fuel flow from chamber 114 into fuel distribution and discharge ring 90.

When coil means 124 becomes energized a magnetic flux is generated and such flux includes armature valving member 136 which reacts by being drawn upwardly against the resistance of spring 150 until such armature valving member 136 operatively abuts against the pole piece means 126 which determines the total stroke or travel of the armature valving member 136. Such total stroke or travel of armature valving member 136, from its seated or closed position to its fully opened position against said related stop or pole piece means, may be, for example, in the order of 0.05 mm.

Figure 2:
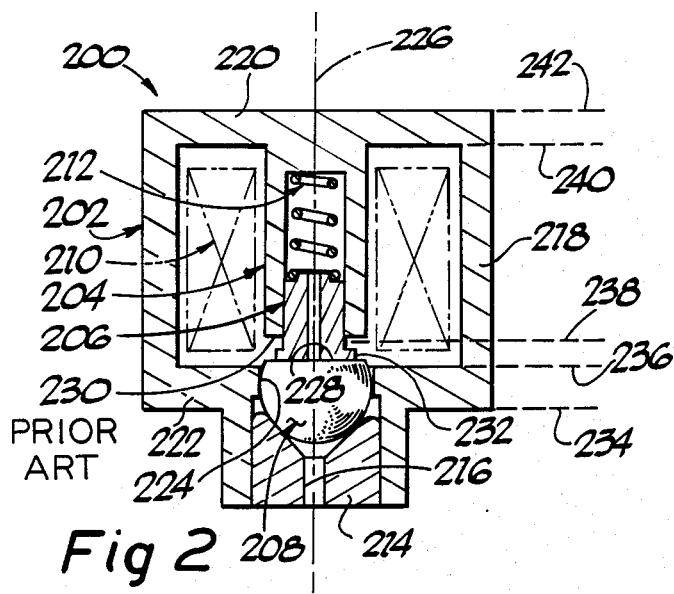
FIG. 2 is an axial cross-sectional view, in simplified form, of an electromagnetic fluid metering valving assembly of the prior art.

FIG. 2 is a simplified axial cross-sectional view of a prior art electromagnetic motor assembly, in the form of a fuel metering and injector valving assembly. Various details which are known in the art, such as a fuel inlet, bobbin structure, seals, etc. are not shown since such are neither germane nor needed to understand the following description relative thereto.

With particular reference to FIG. 2, the prior art electromagnetic assembly 200 is illustrated as comprising, typically, a magnetic body or housing means 202, pole piece means 204, guide member 206, armature-valve 208, electrically energizable coil means 210, return spring 212 and valve seat member 214 with liquid discharge passage means 216 formed therethrough. The magnetic body means 202 is of cylindrical configuration having a magnetic annular side wall 218 and a magnetic upper or top wall 220 circular in outer configuration. In practice, the top wall 220 may actually be a separate magnetic member (or members) suitably connected and secured to the annular side wall 218. Similarly, the pole piece means 204 may be, for example, integrally formed with the top wall 220 or suitably connected and secure thereto. The lower wall 222 of magnetic body means 202 is also of magnetic material and circular in outer configuration. It is not uncommon practice, especially when spherical type armature-valves are employed, to form a bore or guide passage means 224 generally in the lower wall portion 222. As typified by bore 224, such are usually of a diametrical dimension extremely close to the spherical diameter of the valve member, as 208. Therefore, for all practical purposes when such spherical type valves are employed in a guide bore means, typified by 224, the valve may be considered as touching the juxtaposed surface of the guide bore.

Generally, in the prior art structures as exemplified in FIG. 2, when the coil means 210 is in a de-energized state, the spring 212, through the axially movable guide member 206, urges and maintains the valve member 208 closed against the cooperating seat means 214 as depicted. When the coil means 210 becomes energized a magnetic flux is generated and such flux path forms a generally closed magnetic loop of a torus-like configuration about the coil means 210. More particularly, when viewed in the plane of the drawing of FIG. 2, and first considering the side thereof to the right of the central axis 226, such closed magnetic loop flux path would pass upwardly (for purposes of reference and description) through the pole piece 204, into the top wall 220 moving rightwardly toward and into side wall 218 and downwardly thereof into bottom or lower wall 222 and leftwardly thereof into armature-valve 208 and, from the flatted surface 228 of valve 208, into end face 230 of pole piece means 204. Similarly, considering the side to the left of axis 226, the closed magnetic loop flux path would lie as in a pattern extending upwardly through the pole piece 204, into the top wall 220 and then leftwardly to side wall 218 and downwardly thereof to bottom wall 222 and rightwardly therealong to armature-valve 208 and, from the flatted surface 228 to end face 230 of the pole piece 204.

Of course, as a consequence of such flux path and field, armature-valve 208 is drawn upwardly against the resilient resistance of spring 212, through the guide pin or member 206. Such upward movement of the armature-valve 208 continues until the annular flange 232 (or other suitable abutment means) of guide pin means 206 abuts against pole piece end 230. Such flange 232, in the prior art, serves to establish an air gap, between the armature 208 and pole piece 204, which, in turn, is intended to decrease the release or closing time of the valve upon de-energization of the coil means. Some prior art structures, in an attempt to provide for such a gap between the cooperating armature and pole piece faces have plated or otherwise coated one or more of such surfaces as with a non-magnetic material. However, neither of such methods (that is, some spacer means as a flange or non-magnetic shim material or coating with a non-magnetic material) have produced satisfactory release and closing times of the armature.

Figure 4:
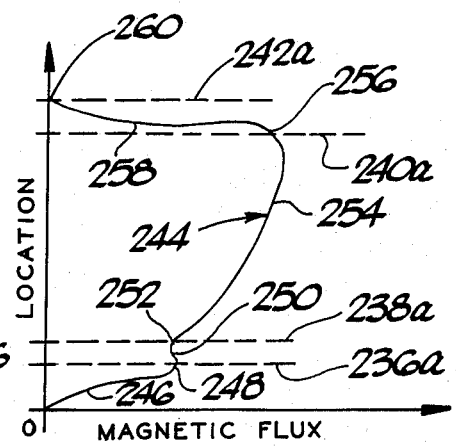
FIG. 4 is a graph illustrating the relationship of flux density compared to its location within the depicted prior art structure of FIG. 2.

The dash lines 234, 236, 238, 240 and 242 of FIG. 2 are intended to represent certain elevations or imaginary reference planes passing through the prior art structure 200. In the graph of FIG. 4, the dash lines 236a, 238a, 240a and 242a are intended to respectively correspond to the elevations or imaginary reference planes 236, 238, 240 and 242 of FIG. 2. The horizontal axis of the graph of FIG. 4 corresponds to the imaginary reference plane 234 of FIG. 2 while the vertical axis may be regarded as an indication of the relative locations of such imaginary planes along the effective axial length of the magnetic body means 202 of FIG. 2. Further, the horizontal axis, as it extends to the right, indicates increasing values of the flux density within the structure of FIG. 2.

A study of the flux density curve 244 of FIG. 4 will show that with the coil means 210 energized the flux density at level or location 234 is, for all practical purposes of zero magnitude and that such flux density increases along curve portion 246 to an increased value at level or location 236, as depicted at point 248 from where the flux density decreases along curve portion 250 to a reduced value at level or location 238, as depicted at point 252. Next, the flux density again increases along curve portion 254 until it reaches a maximum value at level or location 240 as depicted at point 256. Finally, the flux density decreases along curve portion 258 until at level or location 242 it reaches a value generally equal to zero as depicted at point 260.

Figure 3:
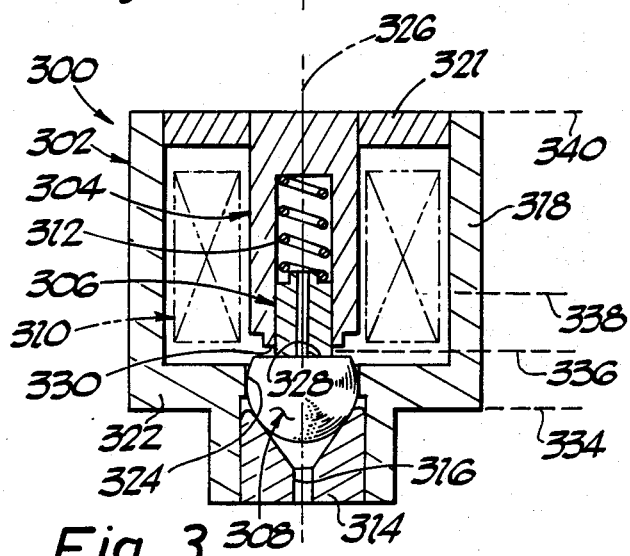
FIG. 3 is an axial cross-sectional view, in simplified form, of an electromagnetic fluid metering valving assembly employing teachings employed in the invention.

FIG. 3 is a simplified axial cross-sectional view of an electromagnetic motor assembly, employing teachings employed by the invention and taking the form of a fuel metering and injector valving assembly. Various details which are known in the art, such as a fuel inlet, bobbin structure, seals etc. are not shown since such are neither germane nor needed to understand the following description relative to FIG. 3.

With particular reference to FIG. 3, the electromagnetic assembly 300 is illustrated as comprising a magnetic body or housing means 302, pole piece means 304, guide pin or member 306, armature-valve 308 electrically energizable coil means 310 return spring 312 and valve seat member 314 with liquid discharge passage means 316 formed therethrough. The magnetic body means 302 is of cylindrical configuration having a magnetic annular side wall 318. A top wall 321 of non-magnetic material, which is depicted as being circular in outer configuration, is operatively connected and secured to the upper end of annular side wall 318. The pole piece 304 of magnetic material is suitably secured to and carried by the top wall 321. The lower wall 322 of magnetic body means 302 is also of magnetic material and circular in outer configuration. As in the embodiment of FIG. 2, a bore or guide passage means 324 is formed generally in the lower wall portion 322. Further, as is often the case, the bore 324 is of a diametrical dimension extremely close to the spherical diameter of the valve member, as 308. Therefore, for all practical purposes when such spherical type valves are employed in a guide bore means, as 324, the valve member may be considered as touching the juxtaposed surface of guide bore.

When the coil means 310 is in a de-energized state, the spring 312, through the axially movable guide member 306, urges and maintains the valve member 308 closed against the cooperating seat means 314 as depicted. When the coil means 310 becomes energized a magnetic flux is generated and such flux path forms a magnetic loop of torus-like configuration about coil means 310. However, to distinguish such magnetic loop from the closed magnetic loop described with reference to the prior art as typified in FIG. 2, the magnetic loop of the structure of FIG. 13 may be considered as an open magnetic loop. More particularly, when viewed in the plane of the drawing of FIG. 3, and first considering the side thereof to the right of the central axis 326, such magnetic flux path would pass upwardly (for purposes of reference and description) through the pole piece 304 and extend beyond the non-magnetic top wall 321 while also directed rightwardly, in a curvilinear manner, to the side wall 318 downwardly thereof into bottom or lower wall 322 and leftwardly thereof into armature-valve 308 and, from the flatted surface of valve 308, into end face 330 of pole piece means 304. Similarly, considering the side to the left of axis 326, the magnetic flux path would lie as in a pattern extending upwardly through the pole piece 304 and extend beyond the non-magnetic top wall 321 while also directed leftwardly, in a curvilinear manner, to the side wall 318 downwardly thereof into bottom or lower wall 322 and rightwardly thereof into armature-valve 308 and, from the flatted surface of valve 308, into end face 330 of pole piece means 304.

As a consequence of such flux path and field, armature-valve 308 is drawn upwardly against the resilient resistance of spring 312, through guide pin or member 306. Such pull-in or upward movement of the armature-valve 308 continues until the flatted surface 328 of armature-valve 308 engages and abuts against the juxtaposed pole piece means end face 330. As should now be noted, the gap between the pole piece end face and the armature-valve member as produced by the flange 232 of the prior art structure of FIG. 2 does not exist in the embodiment of FIG. 3 when the armature-valve 308 is fully pulled-in or, in this case, fully opened. Further, it should be stressed that the flux density at the top of the assembly 300 is significantly less than that of assembly 200 of FIG. 2 and such is due to the elimination of a top wall of magnetic material (as 220 of FIG. 2) and the replacement thereof with a supporting wall structure 321 of non-magnetic material. Accordingly, if the top end wall and side wall along with the pole piece of an electromagnetic assembly are first established as being, for purposes of reference and definition, the stationary portion of such electromagnetic assembly, while the armature and lower end wall are defined as being the moving portion of such electromagnetic assembly, then it becomes evident that in the prior art, as exemplified by the structure of FIG. 2, a magnetic closed loop exists in such stationary portion; however, in comparison, in electromagnetic assemblies employing teachings employed by the invention, a magnetic open loop, for the flux path, exists in the stationary portion thereof. In the embodiment of FIG. 3, the depicted annular top wall 321 is of non-magnetic material thereby resulting in an increase in or an enhanced flux leakage in such area with a consequent reduction in flux density. The provision of such non-magnetic material in the stationary portion of electromagnetic body means results in such a herein defined magnetic open loop flux path. Further, such provision of non-magnetic material in the stationary portion of electromagnetic body means creates what may be defined as an interruption or discontinuity in the flux path of such stationary portion.

Figure 5:
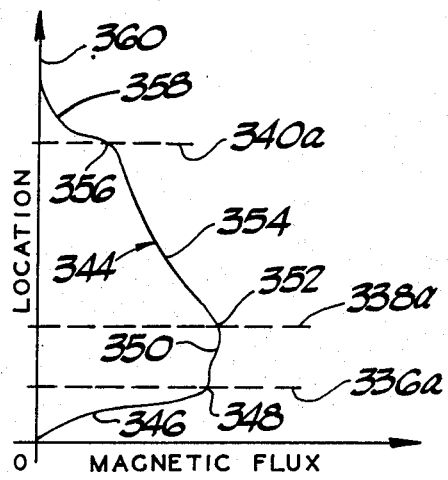
FIG. 5 is a graph illustrating the relationship of flux density compared to its location within the depicted structure of FIG. 3.

The dash lines 334, 336, 338 and 340 of FIG. 3 are intended to represent certain elevations or imaginary reference planes passing through the structure 300. In the graph of FIG. 5, the dash lines 334a, 336a, 338a and 340a are intended to respectively correspond to the elevations or imaginary reference planes 334, 336, 338 and 340 of FIG. 3. The horizontal axis of the graph of FIG. 5 corresponds to the imaginary reference plane 334 of FIG. 3 while the vertical axis may be regarded as an indication of the relative locations of such imaginary planes along the effective axial length of the magnetic body means 302 of FIG. 3. Further, the horizontal axis, as it extends to the right, indicates increasing values of the flux density within the structure of FIG. 3.

A study of the flux density curve 344 of FIG. 5 will show that with the coil means 310 energized the flux density at level or location 334 is, for all practical purposes, of zero magnitude and that such flux density increases along curve portion 346 to an increased value at level or location 336, as depicted at point 348, from where the flux may at first slightly decrease but in the main increases along curve portion 350 until it reaches a maximum value at level or location 338 as depicted at point 352. Next, the flux density decreases along curve portion 354 until it reaches a substantially reduced value at level or location 340 as depicted at point 356. Finally, the flux density further decreases along curve portion 358 until, at some level or location spaced beyond level or location 340, it reaches a value generally equal to zero as depicted at point 360.

In comparing the graphs of FIGS. 4 and 5 it becomes evident that the magnetic closed loop of the prior art produces a very high flux density as from point 252 to point 256 and that upon de-energization of the field coil means the decay time is much longer than the decay time of the structure as graphically represented in FIG. 5. Further, in comparing the graphs of FIGS. 4 and 5 it can be seen that in structure employing teachings employed by the invention the flux density reaches a substantially greater magnitude at point 348 than at the comparable point 248 of FIG. 4 thereby reducing the pull-in time of the armature. Such graphs of FIGS. 4 and 5 graphically illustrate that by providing a magnetic open loop, in the stationary portion of the electromagnetic assembly, which stationary portion is geometrically one of a configuration of revolution about its axis, that: (a) a flux density of increased magnitude, as compared to the prior art, is developed in the area where it is most needed to achieve pull-in of the armature; (b) that such increased magnitude of flux density is attained substantially quicker than what is attained by the prior art and (c) that the magnitude of the flux density in the remaining portion of the said stationary portion is substantially reduced, as compared to the prior art, thereby dramatically reducing the flux decay time, upon de-energization of the field coil means, enabling the quicker return stroke of the armature, as valve 308 to its closed or seated position. As a consequence of this, electromagnetic assemblies employing teachings employed by the invention have substantially quicker opening times, pull-in time of the armature, and substantially quicker closing times (release or return of the armature) as compared to the known best embodiments of the prior art.

Figure 6:
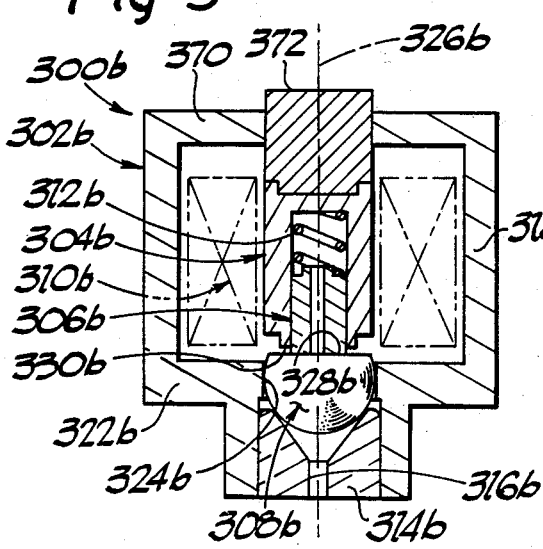
FIG. 6 is an axial cross-sectional view, in simplified form, of another electromagnetic fluid valving assembly employing teachings employed in the invention.

In FIG. 6 all elements which are like or similar to those of FIG. 3 are identified with like reference numbers provided with a suffix "b". Unless specifically noted to the contrary, the operation of the structure of FIG. 6 is as described with reference to FIG. 3 and the characteristic flux density thereof is as represented in and discussed with reference to FIG. 5.

In comparing the structures of FIGS. 6 and 3, it can be seen that the structure of FIG. 6 is provided with an upper wall 370 of magnetic material and that such upper wall is of circular outer configuration at least operatively joined to the cylindrical side wall 318b. In the embodiment of FIG. 6 the magnetic open loop characteristic is achieved by a support means 372 of non-magnetic material for supporting the pole piece means 304b. The juxtaposed axial ends of the support means 372 and pole piece means 304b may be secured to each other by any suitable means as, for example, by brazing. In the embodiment of FIG. 6, the non-magnetic support 327 is shown as extending through the upper or top wall 370 and, in such an arrangement it is contemplated that the non-magnetic support 372 and upper wall 370 may be provided with respective threaded portions for coaction to axially adjust the position of the pole piece means 304b. It is further contemplated that the embodiment of FIG. 6 may be modified by having the upper wall 370 continuous and, instead, suitably operatively securing the non-magnetic support means 372 to the inner side or portion of such magnetic upper wall 370.

In any event, the embodiment depicted or contemplated in FIG. 6 provides for the magnetic open loop or magnetically interrupted loop by means of a gap of non-magnetic material in the stationary portion of the electromagnetic assembly 300b; in this instance the gap of non-magnetic material takes the form of support means 372 for the pole piece means 304b.

Figure 7:
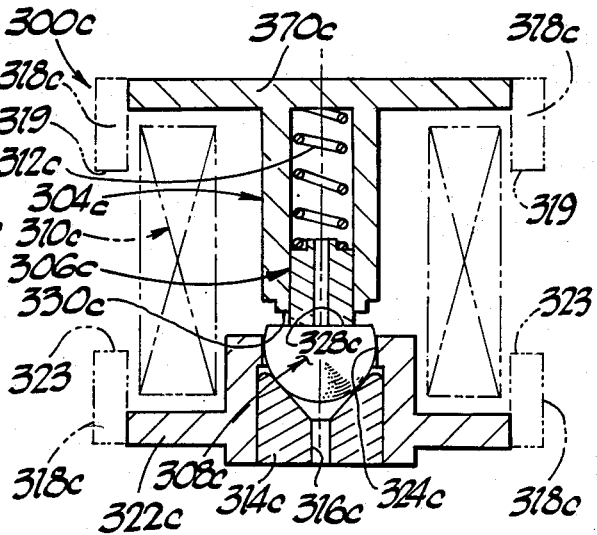
FIG. 7 is an axial cross-sectional view, in simplified form, of still another electromagnetic fluid valving assembly employing teachings employed in the invention.

In FIG. 7 all elements which are like or similar to those of either FIGS. 3 or 6 are identified with like reference numbers provided with a suffix "c". Unless specifically noted to the contrary, the operation of the structure of FIG. 7 is as described with reference to FIG. 3 and the characteristic flux density thereof is as generally represented in and discussed with reference to FIG. 5.

In comparing the structures of FIGS. 7, 6 and 3, it can be seen that the structure of FIG. 7 is provided with an upper wall 370c of magnetic material and that such upper wall is of circular outer configuration as is the lower wall 322c. In the embodiment of FIG. 7 the magnetic open loop characteristic is achieved by elimination of all or a cylindrical portion of the cylindrical side wall as shown at, for example, 218, 318 and 318b of FIGS. 2, 3 and 6, respectively. In actual use, the upper wall 370c and lower wall 322c would, of course, be suitably supported as to maintain an operating relationship. It is also contemplated, as already implied, that some portion or portions of the annular side wall may exist as generally depicted in phantom lines at 318c. In any event, the magnetic open loop is achieved by a gap of non-magnetic material, in the said stationary portion, as between the upper wall 370c and lower wall 322c or, as between the juxtaposed circular or annular ends 319 and 323 of the contemplated annular side wall 318c. In view of the embodiment of FIG. 7 it should be apparent that the non-magnetic material forming the "gap of non-magnetic material" in the said stationary portion, may be a gaseous medium such as, for example, ambient air.

With FIGS. 3, 6 and 7 in mind, it can be seen that the magnetic open loop of FIG. 3 most nearly depicts the magnetic open loop of the assembly 10 of FIG. 1.

For example, in the embodiment of FIG. 1 there is a lower magnetic end wall 84, an annular cylindrical side wall 82 of magnetic material and, of course, the magnetic pole piece means 126. However, there is a gap of non-magnetic material at the upper end and such is formed by the non-magnetic support or body 102. Even if the spring perch 144, which may have a tool-engaging surface means as, for example, a socket 168 for selective adjustment thereof, were to be of magnetic material it still will be magnetically isolated from the magnetic material of wall 82.

As should be evident, the embodiment of the assembly 10 of FIG. 1, in the main, exhibits the characteristic flux density curve of FIG. 5 in that the flux density is more rapidly created (than in the prior art) and located in the area where it most effective for causing pull-in of the armature 136 and, further, because of the creation of an enhanced flux field leakage, in a selected or controlled area the decay time thereof is greatly reduced with the result that the armature 136 (upon coil de-energization) is quickly released for its return stroke by the associated spring means 150. Compared to the known best prior art, electromagnetic assemblies as in FIG. 1 have a far superior electromagnetic efficiency and operate at much higher frequencies which, in turn, translates to much faster pull-in and release times for the armature or, in terms of a valving function, much faster opening and closing times.

Figure 8:
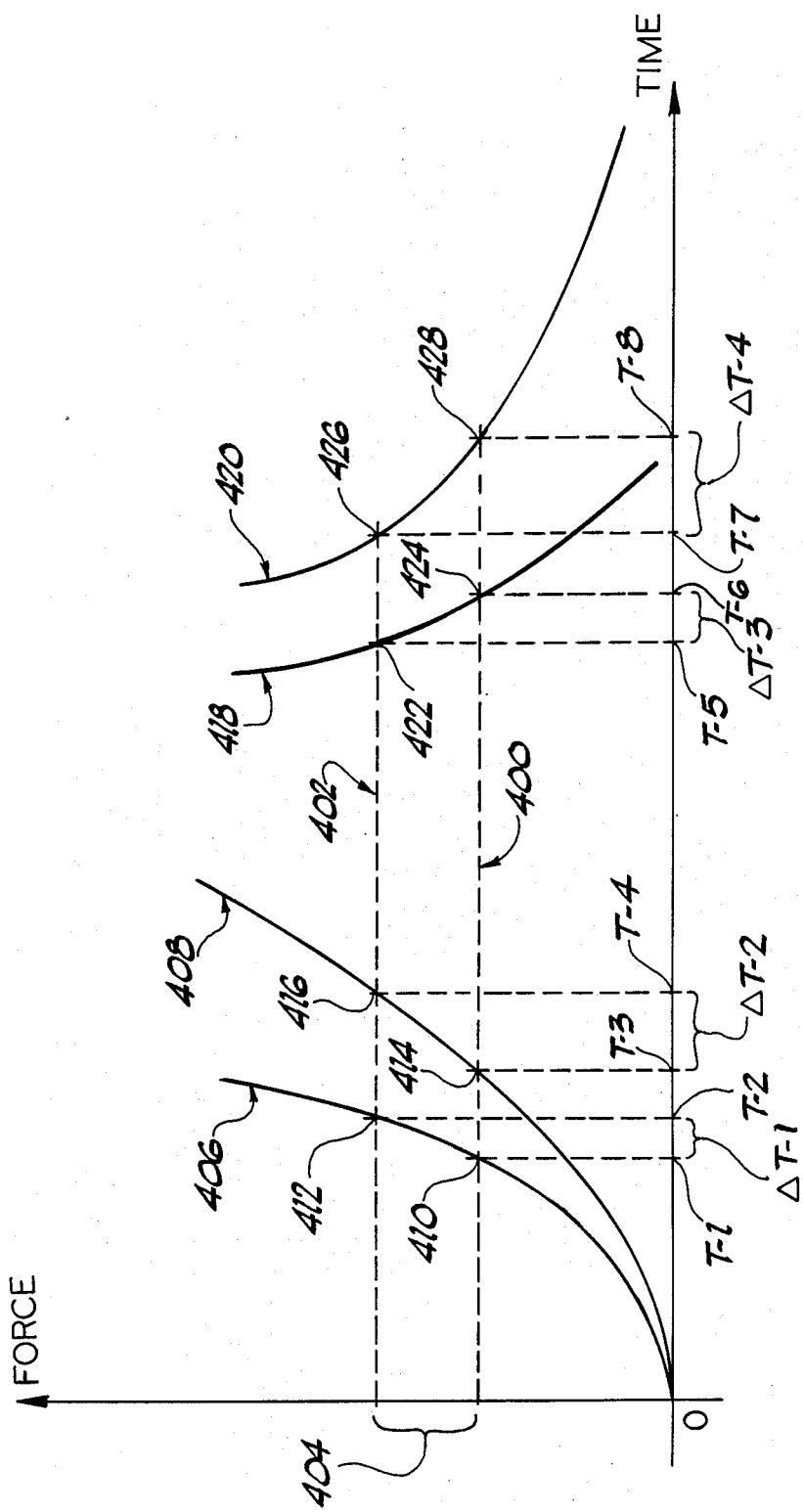
FIG. 8 is a graph illustrating the influence of magnetic force build-up and decay on delay times.

Previously, a "band of uncertainty" in electromagnetic liquid valving assemblies was referred to. FIG. 8 is intended to graphically depict the benefits derived from electromagnetic valving assemblies employing teachings employed by the assembly 10 of FIG. 1 as compared to those of the prior art depicted by FIG. 2. The graph of FIG. 8, in a generally typical manner, illustrates the influence of magnetic force build-up and decay (or delay) times for two classes of electromagnetic valving assemblies (one class being that of the prior art as depicted in FIG. 2 and the other class being that as of the assembly 10) wherein, for purposes of illustration, the band of uncertainty is assumed to be the same for each class.

With greater reference to FIG. 8, the vertical axis represents an increasing magnitude of magnetic force developed by the magnetic flux in the electromagnetic assembly while the horizontal axis represents a time scale. The lower horizontal dash-line 400 represents the lowest magnitude of generated magnetic force which, at times, will be functionally effective to achieve the required result and which, for purposes of definition and illustration, is assumed to define the lower level or magnitude of magnetic force in the said band of uncertainty. The upper horizontal dash-line 402 represents the highest or greatest magnitude of generated magnetic force which, at times, will be functionally effective to achieve the required result and which, for purposes of definition and illustration, is assumed to define the upper level or magnitude of magnetic force in the said band of uncertainty. For purposes of reference the span indicated by bracket 404 depicts such overall band of uncertainty.

Because electromagnetic assemblies as that of FIGS. 1, 3, 6 and 7 no longer require any permanent air gap as between the armature and pole piece means and because the space (when in a de-energized state) between the pole piece and armature is located at least near to the area or location of the strongest magnetic flux, the magnetic efficiency is greatly increased (compared to the prior art as depicted in FIG. 2) which, in turn, means a much quicker build-up in magnetic flux and such translates into much faster armature pull-in (or valve opening) times.

Further, compared to the prior art, electromagnets as that of FIG. 1, for example, have a high reluctance due to the magnetic open loop employing a gap of non-magnetic material in said stationary portion. Because of the very high reluctance, such electromagnets exhibit a very rapid (much more than the prior art) flux decay which, in turn, results in a quicker release of the armature and therefore, with respect to valving assemblies, a much quicker closing time.

With such operating characteristics of electromagnets, and in particular electromagnetic valving assemblies having such magnetic open loop and of the prior art in mind, let curve 406 of FIG. 8 represent the magnetic force build-up (or increase upon coil energization) of an electromagnetic valving assembly employing a magnetic open loop. Further, let curve 408 of FIG. 8 represent the magnetic force build-up (or increase upon coil energization) of a prior art electromagnetic valving assembly as that of FIG. 2. As consistent with the disclosure hereinbefore presented, the rate of magnetic force build-up, in terms of time, represented by curve 406 is quicker than that of curve 408.

If the then existing conditions and factors, hereinbefore described as determining the said band of uncertainty, were such as to cause armature pull-in (valve opening) at the lowest magnitude of magnetic force (depicted by dash-line 400) then the armature of the invention would be pulled-in (or the valve would be opened) as at point 410. On the horizontal axis such point 410 corresponds to a time T-1. However, if the then existing conditions and factors were such as to cause armature pull-in (valve opening) at the highest or greatest magnitude of magnetic force (depicted by dash-line 402) then the armature of the invention would be pulled-in (the valve would be opened) as at point 412. On the horizontal axis such point 412 corresponds to a time T-2.

Now with regard to the prior art as represented by FIG. 2, if the then existing conditions and factors, hereinbefore described as determining the said band of uncertainty, were such as to cause armature pull-in (valve opening) at the lowest magnitude of magnetic force (depicted by dash-line 400) then the armature of the prior art would be pulled-in (the valve would be opened) as at point 414. On the horizontal axis such point 414 corresponds to a time T-3. However, if the then existing conditions and factors were such as to cause armature pull-in (valve opening) at the highest or greatest magnitude of magnetic force (depicted by dash-line 402) then the armature of the prior art would be pulled-in (the valve would be opened) as at point 416. On the horizontal axis such point 416 corresponds to a time T-4.

Now considering the release and closing times, curve 418 of FIG. 8 is intended to represent the magnetic flux decay in electromagnetic assemblies employing teachings of the invention while curve 420 is intended to represent the magnetic flux decay of a prior art electromagnetic assembly. As consistent with the disclosure hereinbefore presented, the rate of flux decay, in terms of time, represented by curve 418 is quicker than that of curve 420.

With respect to curve 418, if the then existing conditions and factors, hereinbefore described as determining the said band of uncertainty, were such as to result in the release of the armature (valve closure) at the highest or greatest magnitude of magnetic force (depicted by dash-line 402) then the armature 136 would be released (the valve closed) as at point 422. On the horizontal axis such point 422 corresponds to a time T-5. However, if the then existing conditions and factors were such as to result in the release of the armature (valve closure) at the lowest magnitude of magnetic force (depicted by dash-line 400) then the armature, as 136, would be released (the valve closed) as at point 424. On the horizontal axis such point 424 corresponds to a time T-6.

Now with regard to the prior art, as in FIG. 2, if the then existing conditions and factors, hereinbefore described as determining said band of uncertainty, were such as to result in the release of the armature (valve closure) at the highest or greatest magnitude of magnetic force (depicted by dash-line 402) then the armature of the prior art would be released (the valve closed) as at point 426. On the horizontal axis such point 426 corresponds to a time T-7. However, if the then existing conditions and factors were such as to result in the release of the armature (valve closure) at the lowest magnitude of magnetic force (depicted by dash-line 400) then the armature of the prior art would be released (the valve closed) as at point 428. On the horizontal axis such point 428 corresponds to a time T-8.

For ease of reference, in FIG. 8 the difference in time between: (a) T-1 and T-2 is identified as $\Delta T1$; (b) T-3 and T-4 is identified as $\Delta T2$; (c) T-5 and T-6 is identified as $\Delta T3$ and (d) T-7 and T-8 is identified as $\Delta T4$.

An inspection of FIG. 8 will show that $\Delta T1$ is substantially less than $\Delta T2$ which, of course, means that by comparison the pull-in of the armature (valve opening) of the invention (as in FIG. 1) has greater uniformity and consistency than that of the prior art (as in FIG. 2). Likewise, $\Delta T3$ is substantially less than $\Delta T4$ which means that by comparison the release of the armature (valve closing) of the invention (as in FIG. 1) also has greater uniformity and consistency than that of the prior art (as in FIG. 2), with both of these being referenced to time, even though the said band of uncertainty is assumed to be the same for both the prior art and the invention.

Further, as far as speed of operation or response time is concerned, it can be seen that regardless of whether the armature, as for example 136, is pulled-in at point 410 or point 412 that the time of occurrence thereof (respectively T-1 and T-2) is still far less than either times T-3 or T-4 for the prior art structure of FIG. 2. Similarly, the release time of the armature 136, regardless of whether such release occurs at point 422 or point 424, that the time of occurrence thereof (respectively T-5 and T-6) is far less than either times T-7 or T-8 for the prior art structure of FIG. 2.

Accordingly, it should be apparent that electromagnetic assemblies employing teachings employed by the invention are, among other things: more magnetically efficient; substantially faster in operation; substantially more uniform in terms of time in the pull-in and release of the armature and substantially more uniform and consistent in their operating characteristics than the electromagnetic assemblies of the prior art as represented by FIG. 2.

Figure 9:
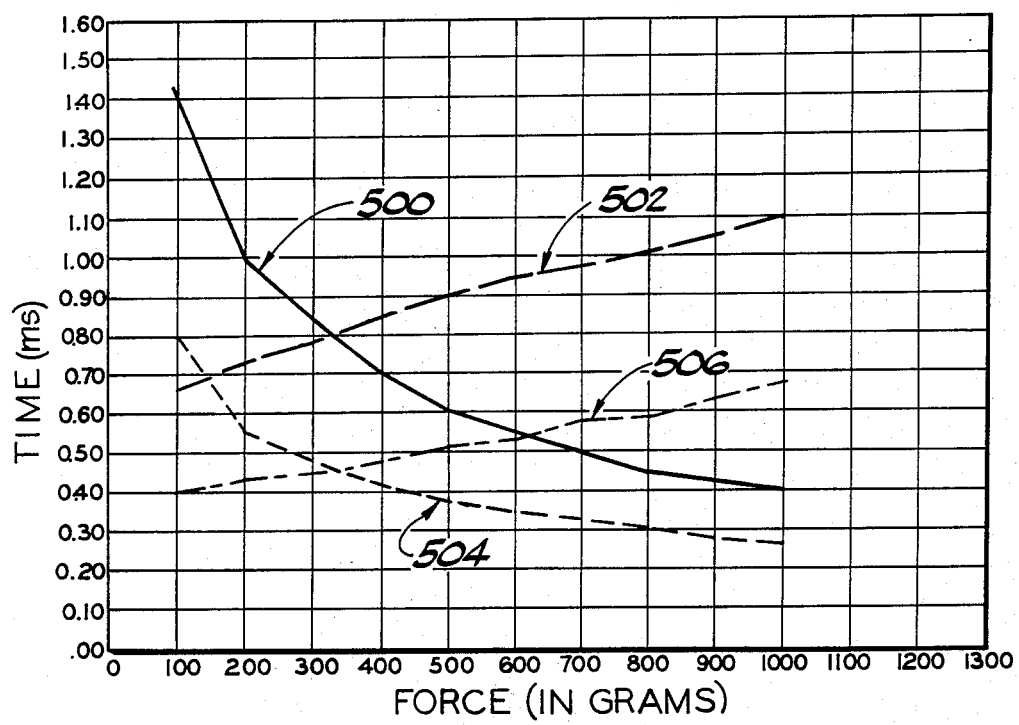
FIG. 9 is a graph depicting the characteristic opening and closing times of electromagnetic fluid valving assemblies employing teachings of the invention and electromagnetic fluid valving assemblies according to the prior art.

FIG. 9 graphically illustrates the armature-valve opening and closing times of two electromagnetic valving assemblies which for all practical purposes were identical to each other except that one of such assemblies employed the magnetic open loop (as hereinbefore disclosed and defined) while the other assembly employed the magnetic closed loop of the prior art.

In FIG. 9 the vertical axis is the time axis in terms of milliseconds while the horizontal axis is the corresponding return spring load force in terms of grams. In FIG. 9 plotted curve 500 represents the closing time of a prior art magnetic closed loop electromagnetic valving assembly and plotted curve 502 represents the opening time of the same prior art electromagnetic valving assembly. In comparison, plotted curve 504 represents the closing time of a magnetic open loop electromagnetic valving assembly, as that of FIG. 1, while plotted curve 506 represents the opening time of the same magnetic open loop electromagnetic valving assembly. As is evident from the comparative curves of the graph of FIG. 9, the opening and closing times of the magnetic open loop electromagnetic assembly are not only substantially faster but actually dramatically faster than the opening and closing times of the prior art electromagnetic assembly as that of FIG. 2.

Figure 10:
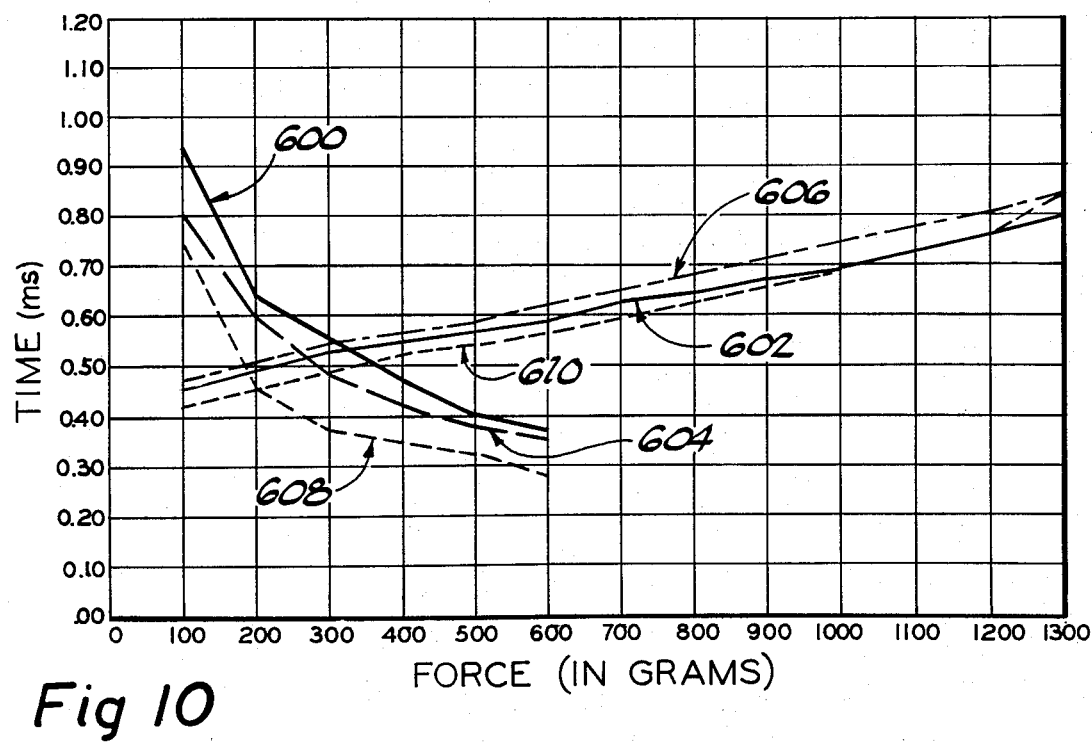
FIG. 10 is a graph depicting opening and closing times compared to return spring loads for three electromagnetic assemblies employing teachings of the invention but respectively formed of different magnetic materials.

While testing electromagnetic assemblies employing the disclosed open loop, a further benefit was observed. FIG. 10 graphically illustrates such benefit. In FIG. 10 the opening and closing times of three magnetic open loop electromagnetic assemblies were plotted against the return spring loads (force) for such assemblies. Such three assemblies differed from each other only in the magnetic material used for forming the said stationary portion of the electromagnetic assembly. The three materials thusly employed were; (a) low carbon steel, (b) silicon iron and (c) Grade 416 stainless steel none of which were annealed.

In FIG. 10 the vertical axis is the time axis in terms of milliseconds while the horizontal axis is the corresponding return spring load force in terms of grams. In FIG. 10 the plotted curves 600 and 602 respectively represent the closing time and opening time (versus spring load) for a magnetic open loop electromagnetic assembly employing low carbon steel; plotted curves 604 and 606 respectively represent the closing time and opening time (versus spring load) of a magnetic open loop electromagnetic assembly employing silicon iron and plotted curves 608 and 610 respectively represent the closing time and opening time (versus spring load) for a magnetic open loop electromagnetic assembly employing Grade 416 stainless steel.

FIG. 10 graphically illustrates the fact that even though three completely different magnetic materials were employed in such magnetic open loop electromagnets, the resulting performance curves are very closely grouped especially when contrasted with the prior art magnetic closed loop electromagnets which exhibit a very wide range of such performance curves with similarly differing materials. Consequently, it is apparent that providing a gap of non-magnetic material, as to create the inventive magnetic open loop, results in an electromagnetic assembly which exhibits a very low sensitivity to changes or variations in the magnetic properties of the materials used in forming said stationary portion.

It should be pointed out that during testing and experimentation it has been determined that optimum performance of the inventive magnetic open loop circuit herein described and disclosed is achieved when at least a certain minimum relationship is achieved in the structure employing such magnetic open loop. When such a minimum relationship is achieved then the full benefits of controlled flux leakage, rapid armature pull-in time and rapid flux decay and armature release are attained.

More particularly, it has been discovered that the gap in the otherwise magnetic material of the stationary or non-moving portion of the electromagnetic motor or circuit should be of a dimension equal to at least 40.0% of the distance between the outer surface of the pole piece means and the inner surface of the magnetic outer housing with the measurement of such distance being taken as on a plane perpendicular to the axis of the pole piece and passing through the axial mid-point of the associated coil means. The following would be by way of example. That is, in FIG. 1, the imaginary measuring plane would be perpendicular to axis 170, pass through the pole piece 126 and through the axial mid-point of coil means 124. The radial distance (hereinafter referred to as "gauge distance"), along such imaginary plane, between the outer surface of the pole piece 126 and the inner surface of the outer tubular housing 82 would be measured and the "magnetic gap" (previously described) as generally existing above the coil means 124 would then have to have a radial length of at least 40.0% of said "gauge distance".

With reference to FIG. 3, the imaginary plane would be perpendicular to the axis 326 of pole piece means 304, pass through the pole piece 304 and through the axial mid-point of the coil means 310. The "gauge distance" along such imaginary plane, between the outer surface of the pole piece 304 and the inner cylindrical surface of housing 302 would be measured and the "magnetic gap", as represented by the annular non-magnetic means 321, would then have to have a radial length of at least 40.0% of said "gauge distance".

With reference to FIG. 6, the imaginary plane would be perpendicular to the axis 326$b$ of pole piece means 304$b$, pass through the pole piece 304$b$ and through the axial mid-point of the coil means 310$b$. The "gauge distance" along the imaginary plane, between the outer surface of the pole piece 304$b$ and the inner cylindrical surface of the housing 302$b$ would be measured and the "magnetic gap", as represented by the non-magnetic cylinder or support 372 would have a minimum diameter of 40.0% of said "gauge distance". Further, if the diameter of such support 372 were to be made significantly less than 40.0% of said "gauge distance" then it would be preferred that the effective axial length of such non-magnetic support 372, as measured from the inner surface of upper wall 370 to the effective upper end of the pole piece 304$b$ be at least 40.0% of said "gauge distance".

With reference to FIG. 7, the imaginary plane would be perpendicular to the axis of pole piece 304$c$, pass through the pole piece 304$c$ and through the axial midpoint of the coil means 310$c$. The "gauge distance", in this embodiment, would be established along the imaginary plane between the outer surface of the pole piece 304$c$ and the inner surface of what would in turn be an imaginary cylindrical outer housing wall if such were provided to closely contain the circular outer periphery of upper and lower walls 370$c$ and 322$c$. In that case the "magnetic gap" as measured between the inner surfaces of the upper and lower end walls 370$c$ and 322$c$ would be equal to at least 40.0% of said "gauge distance". In the event that the embodiment of FIG. 7 were to be provided with either or both a cylindrical depending wall portion 318$c$ or a cylindrical upstanding wall portion 318$c$, the "gauge distance" would be similarly determined as by measuring to the inner surface of the imaginary extension of such depending and/or upstanding cylindrical wall portions and the "magnetic gap", generally cylindrical in configuration, would have an axial length, as for example between spaced surfaces 319 and 323, of at least 40.0% of the "gauge distance".

Throughout this application, including the claims, terms and/or expressions such as, for example: (a) "gap of non-magnetic material"; (b) "a magnetic interruption"; (c) "magnetic open loop circuit"; (d) "significant gap of non-magnetic material"; (e) "significant non-magnetic interruption"; (f) "significantly non-magnetic interruption"; (g) "significant gap" and (h) "magnetic disconnection" as well as other similar terms and expressions have been employed. In addition to whatever particular definitions may have been specifically ascribed to such terms and/or expressions, it is to be understood that each of such terms and/or expressions are to be read as meaning a distance or length of at least 40.0% the "gauge distance" as herein disclosed and described.

Further, it is to be understood that when either: (a) a "gap of non-magnetic material"; (b) a "magnetic interruption"; (c) "magnetic open loop circuit"; (d) "significant gap of non-magnetic material"; (e) "significant non-magnetic interruption"; (f) "significantly non-magnetic interruption"; (g) "significant gap" or (h) "magnetic disconnection", as well as other similar terms and expressions, are employed in either the disclosure or claims hereof, such are neither intended nor do apply to structures, in the general field of electromagnetic motor means, which might be said to have such formed exclusively in the end wall of the stationary portion of the electromagnetic body means through which end wall the armature means is either guided or received. That is, by way of example and more particularly, referring to any of FIGS. 1 and 3, it will be seen that the "gap of non-magnetic material" exists in: (1) the upper end or upper end wall, and not in the lower end wall (84, 322), as in FIGS. 1 and 3; (2) the pole piece means or pole piece support means (372), and not in the lower end wall (322b), as in FIG. 6 and (3) in the generally cylindrical side wall, and not in the lower end wall (322c), as in FIG. 7. Nowhere is it disclosed nor is it intended that the "gap of non-magnetic material" as hereinbefore disclosed and described be located exclusively in or exclusively form the lower end wall (which by definition is that axially situated wall which guides and/or receives the armature means) of the stationary portion of the electromagnetic body means. It has been determined that such a "gap of non-magnetic material" (of dimensions at least as large as herein defined) when formed in, or actually forming, the axially situated end wall, which wall guides and/or receives the armature means, does not provide the benefits herein described as obtained by having the "gap of non-magnetic material" located in either the: (a) cylindrical side wall; (b) upper axial end wall (opposite to said lower axial end wall) or (c) pole piece means or pole piece support means.

In view of the foregoing it is further apparent that a fuel metering and injection system employing an electromagnetic valving assembly as herein disclosed and employing a magnetic open loop will result in superior fuel metering characteristics as compared to the prior art. Further, it should be obvious that an electromagnetic assembly as herein disclosed and employing a magnetic open loop as disclosed will in and of itself function with superior operating characteristics regardless of the environment in which it may be employed.

Referring to FIG. 1, the electromagnetic motor means of the metering valving assembly 10 is preferably formed as to provide suitable tool engaging surface means (not shown) as on or in the portion 104 whereby the entire non-magnetic body 102 may be threadably rotated and thereby axially positioned as relative to the seating surface 88 and the cup-shaped armature-valve 136. By so doing the axial end face 130 of the pole piece means 126, which may be press-fitted into non-magnetic body 102, may be brought to the desired distance relative to the axial end wall 134 of armature-valve 136 and consequently establish the desired stroke thereof. Obviously, once the stroke is established, the desired spring pre-load on the armature-valve 136 can be established by threadable adjustment of the spring perch member 144.

The invention as disclosed in FIG. 1, has been illustrated as a single valving assembly for metering fuel to a combustion engine. However, it should be apparent that the invention could be employed as a plurality of valving assemblies for metering fuel to a combustion engine and, further, that the valving assembly of the invention could be employed for metering of fluids in a different environment.

Also as should be apparent, the valving assembly of the invention, in its preferred embodiment, is of the duty-cycle type which may have an operating cycle ranging, for example, from 50 to 200 (or even more) cycles per second. Even though the liquid being metered is accordingly actually cyclically terminated and initiated, the net effect is to create what may be considered, for practical purposes, a continuous flow but of varying rates depending on the energization and de-energization of the coil means 124 brought about by control means 16.

Although only a preferred embodiment of the invention has been disclosed and described, other embodiments and modifications of the invention are possible within the scope of the appended claims.

What is claimed is:

1. A valving assembly for cyclically permitting and terminating fluid flow, comprising stationary magnetic body means of magnetic material, said magnetic body means being formed as to have a first axis of revolution, pole piece means situated as to be centrally of and functionally stationary with respect to said magnetic body means, electrical coil means effective upon energization thereof to create a magnetic field, valve seat means, fluid flow passage means formed through said valve seat means, said pole piece means comprising a pole piece face portion, an armature-valve member situated generally between said pole piece face portion and said valve seat means, resilient means normally resiliently urging said armature-valve member in a first direction whereby said armature-valve member moves toward operative seating engagement with said valve seat means as to thereby terminate flow of said fluid through said fluid flow passage means, said armature-valve member being moved in a second direction opposite to said first direction and into contact with said pole piece face portion upon energization of said coil means thereby permitting flow of said fluid through said fluid flow passage means, said magnetic body means and said pole piece means functioning to provide a magnetic flux path loop about said electrical coil means upon energization thereof, wherein said flux path loop is comprised of a non-moving portion and of a moving portion, wherein said moving portion comprises said armature-valve member wherein said non-moving portion comprises said pole piece means and said stationary magnetic body means, and a gap of non-magnetic material having a second axis of revolution substantially aligned with said first axis of revolution, said gap of non-magnetic material forming a magnetic interruption in said non-moving portion for enhancing flux leakage in the vicinity of said gap of non-magnetic material thereby reducing the flux decay time in said flux path loop upon de-energization of said coil means and enabling said resilient means to move said armature-valve in said first direction, and wherein said armature-valve member is of cup-shaped configuration having an armature-valve axial end wall and an armature-valve cylindrical side wall.

2. A fuel metering valve assembly for metering fuel to an associated combustion engine, comprising magnetic housing means of magnetic material, said magnetic housing means being of generally cup-shaped configuration and comprising axially extending tubular cylindrical side wall means open at a first axial end and having a transversely situated axial end wall at a second axial end opposite to said first axial end, pole piece means situated as to be centrally of and stationary with respect to said magnetic housing means, said pole piece means being at least in part tubular and of generally cylindrical configuration and having pole piece end face means, electrical coil means effective upon energization thereof to create a magnetic field, armature-valve means, said armature-valve means comprising armature-valve end face means, said armature-valve means being moved as to have said armature-valve end face means contact with said pole piece end face means upon energization of said coil means, and support means of non-magnetic material operatively connected to said cylindrical side wall means at said first axial end thereof, said pole piece means being operatively connected to and carried by said support means of non-magnetic material, fuel flow discharge passage means, valve seat means formed generally about said fuel flow discharge passage means, wherein at least a part of said armature-valve means is situated generally between said valve seat means and said pole piece means and positioned as to have said armature-valve end face means directed generally toward said pole piece end face means, resilient means operatively engaging said armature-valve means and being effective to resiliently urge said armature-valve means in a first direction to a first position whereat said armature-valve means comes into seating engagement with said valve seat means to terminate the flow of fuel through said fuel flow discharge passage means, wherein upon energization of said coil means said armature-valve means is moved against the resilient resistance of said resilient means in a second direction opposite to said first direction and to a second position whereat said armature-valve end face means contacts said pole piece end face means and flow of fuel through said fuel flow discharge passage means is permitted, and wherein said support means of non-magnetic material is operatively connected to said cylindrical side wall means by first and second coacting threaded portions respectively carried by said support means and said cylindrical side wall means.

3. A fuel metering valve assembly according to claim 2 wherein the axial position of said pole piece means, selectively adjustable by employment of said first and second coacting threaded portions for the threadable rotation of said support means relative to said cylindrical side wall means.

4. A fuel metering valve assembly according to claim 2 wherein said armature-valve means comprises a cup-shaped configuration having a cylindrical armature side wall and a transverse armature axial end wall, wherein at least a part of said transverse armature axial end wall is between said pole piece end face means and said valve seat means, and wherein at least a part of said cylindrical armature side wall is annularly between said coil means and said cylindrical side wall means.

5. A fuel metering valve assembly according to claim and further comprising adjustable seat means for operatively engaging and selectively establishing a magnitude of pre-load force on said resilient means when said armature-valve means is in said first position, and wherein said adjustable seat means is carried by said support means of non-magnetic material.

6. A fuel metering valve assembly according to claim 3 wherein said support means of non-magnetic material comprises bobbin means carrying said coil means, and wherein said threadable rotation of said support means for selective axial adjustment of said pole piece means causes simultaneous axial adjustment of said bobbin means and said coil means relative to said cylindrical side wall means.

* * * * *